US009302647B2

(12) United States Patent
Fasching

(10) Patent No.: US 9,302,647 B2
(45) Date of Patent: Apr. 5, 2016

(54) LOCKING UNIT WITH END-POSITION LOCKING CATCH FOR A SEATBELT RETRACTOR

(75) Inventor: Thomas Fasching, Salzburg (AT)

(73) Assignee: FASCHING SALZBURG GMBH, Salzburg (AT)

( * ) Notice: Subject to any disclaimer, the term of this patent is extended or adjusted under 35 U.S.C. 154(b) by 236 days.

(21) Appl. No.: 13/884,354

(22) PCT Filed: Oct. 4, 2011

(86) PCT No.: PCT/EP2011/067327
§ 371 (c)(1),
(2), (4) Date: May 9, 2013

(87) PCT Pub. No.: WO2012/062516
PCT Pub. Date: May 18, 2012

(65) Prior Publication Data
US 2013/0221148 A1   Aug. 29, 2013

(30) Foreign Application Priority Data

Nov. 11, 2010   (AT) ................. GM694/2010

(51) Int. Cl.
*B60R 22/46*   (2006.01)
*B60R 22/38*   (2006.01)
*B60R 22/41*   (2006.01)
*B60R 22/34*   (2006.01)

(52) U.S. Cl.
CPC ................. *B60R 22/38* (2013.01); *B60R 22/41* (2013.01); *B60R 2022/3419* (2013.01)

(58) Field of Classification Search
USPC ......................................................... 242/383
See application file for complete search history.

(56) References Cited

U.S. PATENT DOCUMENTS 4,497,458 A * 2/1985 Gueguen et al. ........... 242/383.2
5,507,448 A   4/1996 Park et al.

(Continued)

FOREIGN PATENT DOCUMENTS

DE   102008053853 A1   7/2009

*Primary Examiner* — Emmanuel M Marcelo
*Assistant Examiner* — Angela K Caligiuri
(74) *Attorney, Agent, or Firm* — Birch, Stewart, Kolasch & Birch, LLP

(57) ABSTRACT

The invention relates to a locking unit (4) for a seat belt retractor (1), which locking unit (4) is provided at one end of a seat belt spool (3) of the seat belt retractor (1), on which a seat belt (2) is retracted, so that when the seat belt (2) is quickly unrolled a locking arm (14) of a locking lever (13) is locked with an internal gearwheel (Z), as a result of which the seat belt spool (3) is locked, wherein the locking unit (4) has the following elements:

the locking lever (13) with a center of rotation (D) arranged spaced apart from the center of the seat belt spool (3), an actuator arm (15) and the locking arm (14);

a triggering unit having an inertia weight (17), a counter-pressure spring (18) and a transmission arm, which engages with the actuator arm (15), wherein the triggering unit is formed to rotate the locking lever (13) about the center of rotation (D) and to lock the locking arm (14) by means of the stationary internal gearwheel (Z) that is arranged about the locking lever (13) in the case of a fast acceleration of the unrolling of the safety belt (2), conditioned by the inertia force of the inertia weight (17) acting against the spring force of the counter-pressure spring (18), wherein a cover ring (19) is provided between the locking lever (13) and the internal gearwheel (Z), which cover ring (19) can be rotated into a covering position when the seat belt (2) is retracted, in which covering position the cover ring (19) at least partially covers the region between the locking arm (14) and the internal gearwheel (Z) in order to prevent locking, and which can be rotated into a release position when the seat belt (2) is unrolled, in which release position the cover ring (19) releases the region between the locking arm (14) and the internal gearwheel (Z) in order to permit locking.

12 Claims, 3 Drawing Sheets

(56) References Cited

U.S. PATENT DOCUMENTS

| | | | |
|---|---|---|---|
| 6,241,173 B1 * | 6/2001 | Wier | 242/382 |
| 6,322,018 B1 * | 11/2001 | Smithson et al. | 242/384 |
| 2003/0111571 A1 * | 6/2003 | Weller | 242/383.2 |
| 2007/0216214 A1 * | 9/2007 | Delventhal et al. | 297/478 |
| 2009/0189006 A1 | 7/2009 | Bok et al. | |
| 2009/0212159 A1 * | 8/2009 | O'Brien et al. | 244/121 |

* cited by examiner

LOCKING UNIT WITH END-POSITION LOCKING CATCH FOR A SEATBELT RETRACTOR

This application is the National Phase Under 35 U.S.C. §371 of PCT International Application No. PCT/EP2011/067327 which has an International filing date of Oct. 4, 2011, which claims priority to Austrian Patent Application No. GM 694/2010 filed on Nov. 11, 2010. The entire contents of all applications listed above are hereby incorporated by reference.

BACKGROUND OF THE INVENTION

The invention relates to a locking unit for a seat belt retractor, which locking unit is provided at one end of a seat belt spool of the seat belt retractor, on which a seat belt is retracted, so that when the seat belt is quickly unrolled a locking arm of a locking lever is locked with an internal gearwheel, as a result of which the seat belt spool is locked, wherein the locking unit has the following elements:
the locking lever with a centre of rotation arranged spaced apart from the centre of the seat belt spool, an actuator arm and the locking arm;
a triggering unit having an inertia weight, a counter-pressure spring and a transmission arm, which engages with the actuator arm, wherein the triggering unit is formed to rotate the locking lever about the centre of rotation and to lock the locking arm with the stationary internal gearwheel that is arranged about the locking lever in the case of a fast acceleration of the unrolling of the safety belt, conditioned by the inertia force of the inertia weight acting against the spring force of the counter-pressure spring.

Such a locking unit is known from the document DE 10 2008 053 853 A1, wherein a seat belt system and the functions thereof are described in greater detail. The known locking units is intended to discontinue the unrolling of the seat belt of a vehicle in the case of a collision having happened and the belted up passenger being catapulted forwards. In this case, the unrolling velocity of the seat belt is more quickly increased than determined by the safety standards. A triggering unit of the known locking unit has an inertia weight and a coil spring as a counter-pressure spring. In the case of fast acceleration of the seat belt spool, the inertia weight will retard the acceleration of the triggering unit, which is why the inertia force of the inertia weight will act against the spring force of the counter-pressure spring, Starting with a maximum acceleration of the unrolling process that is determined by the inertia weight and the spring force, there is initiated that the locking lever is rotated against the spring force about the centre of rotation until the locking arm engages with the internal gearwheel and locks the seat belt spool against further unrolling of the seat belt.

In the document mentioned above there is already made reference to the problem of the end-position locking of the seat belt, which becomes apparent when the seat belt is retracted and the belt tongue abuts at a vehicle component, for example. Upon the abrupt stopping of retraction the inertia weight effectuates the triggering unit locking the seat belt. if this locking is realized when the seat belt is more or less completely retracted on the seat belt spool, then the locking cannot be released anymore by relaxing the seat belt, whereupon the seat belt retractor has to be unlocked by an authorized specialized workshop.

In order to prevent the end-position locking of the seat belt, the known seat belt retractor has a locking unit with an end-position locking catch, which is formed by a planetary gearing having two gearwheels and two locking pegs, When the seat belt is retracted, the planetary gearing rotates the locking peg into a position, in which the locking arm of the locking lever is blocked and rotating of the locking lever and thus locking of the locking arm with the internal gearwheel is prevented.

In the known locking unit for a seat belt retractor it has shown to be disadvantageous the construction of the end-position locking catch by way of the planetary gearing is complex and, hence, on the one side, prone to failures and, on the other side, also expensive to produce.

SUMMARY OF THE INVENTION

The invention is based on the task to provide an improved locking unit for a seat belt retractor, which solves the problem of the end-position locking by way of a rather simple and reliable construction.

According to the invention, this task is solved by the provision of a cover ring between the locking lever and the internal gearwheel, which cover ring can be rotated into a covering position when the seat belt is retracted, in which covering position the cover ring at least partially covers the region between the locking arm and the internal gearwheel in order to prevent locking, and which can be rotated into a release position when the seat belt is unrolled, in which release position the cover ring releases the region between the locking arm and the internal gearwheel in order to permit locking.

Thereby, there is achieved the advantage that by means of a simple cover ring, dependent on the direction of rotation of the seat belt spool of the seat belt retractor, the locking arm may engage with the internal gearwheel for locking or be prevented to do so by the cover ring.

BRIEF DESCRIPTION OF THE DRAWINGS

Further advantageous embodiments of the invention will be described in greater detail in the following by way of the figures.

DETAILED DESCRIPTION OF THE INVENTION

Figure 1:
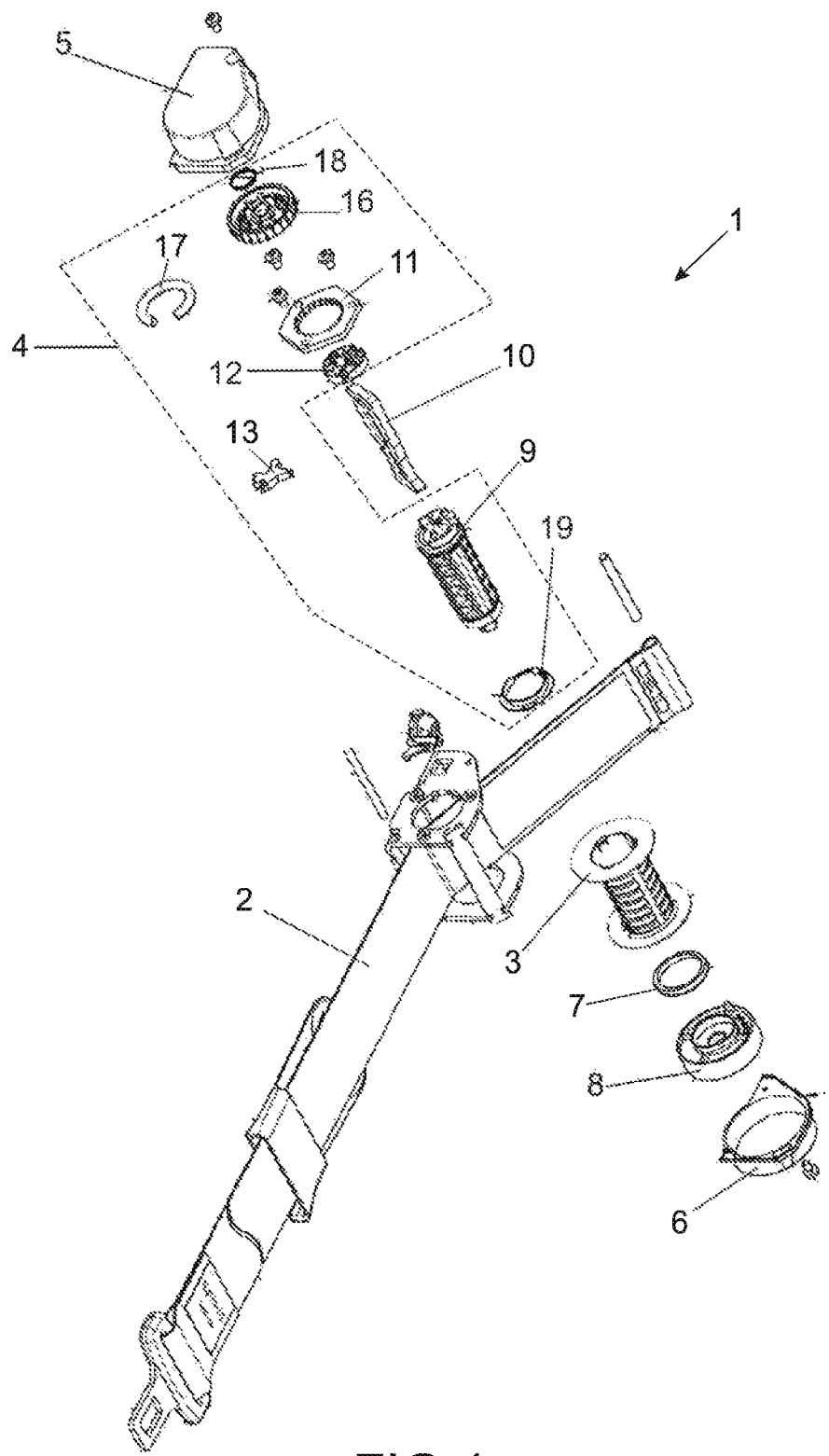
FIG. 1 shows a seat belt retractor having a locking in an exploded view.

FIG. 1 shows a seat belt retractor 1 of the seat belt system of a vehicle in an exploded drawing. It is the task of the seat belt retractor 1 to retract the seat belt 2 on a seat belt spool 3 and to stop unrolling of the seat belt 2 in the case of a vehicle collision. For this reason, the seat belt retractor 1 has a locking unit 4, the individual parts and function thereof will be explained in greater detail in the following.

The seat belt retractor 1 further has a housing having two housing parts 5 and 6 as well as a mainspring 7 including spring housing 8 for retracting the seat belt 2. In the seat belt spool 3 there is provided a seat belt shaft 9, through which there is inserted an insert 10, wherein the seat belt shaft 9 as well as the insert 10 is positively accommodated in the seat belt spool 3 and rotated together with the seat belt spool 3.

Figure 2:
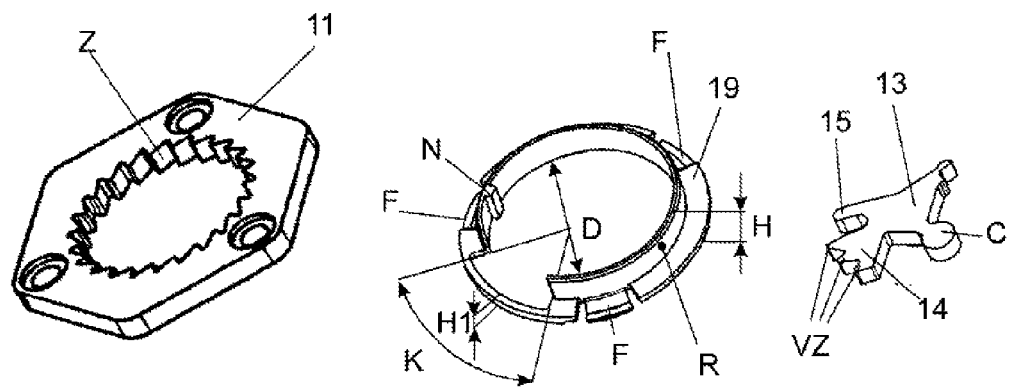
FIG. 2 shows the internal gearwheel, the cover ring and the locking lever of the locking unit according to FIG. 1.
Figure 3:
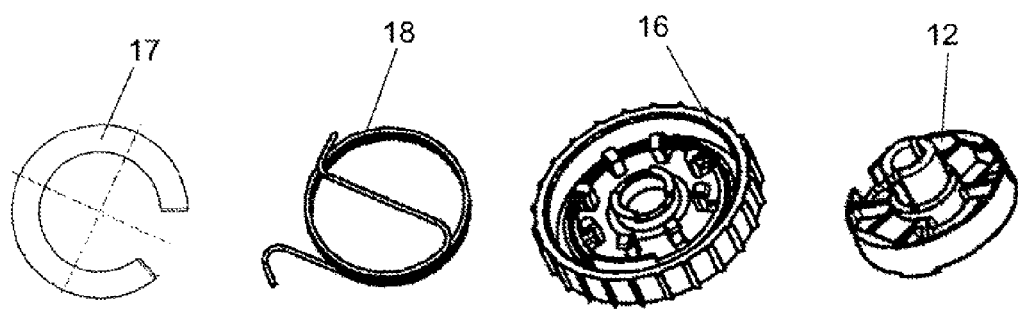
FIG. 3 shows the triggering unit of the locking unit according to FIG. 1.

The locking unit 4 that is partly illustrated in greater detail in the FIGS. 2 and 3 is positively mounted at one end of the seat belt spool 3 on the insert 10. The locking unit 4 has an annular gear 11 with an internal gearwheel Z, wherein the annular gear 11 is connected with the housing and, consequently, does not rotated when the seat belt 2 is retracted and unrolled. In the seat belt shaft 9 there is provided a recess spaced apart from the centre of the seat belt spool 3 or the axis of rotation thereof, respectively, in which a centre of rotation C of a locking lever 13 is rotatably arranged. The locking lever 13 may be rotated about the centre of rotation C into a locking position and into a release position. In the locking position the locking unit 4, via the insert 10 and the seat belt shaft 9, blocks the rotation of the seat belt spool 3, whereas the seat belt spool 3 may be freely rotated in the release position.

The locking lever 13 further has a locking arm 14, at the end of which three locking teeth VZ are provided. If the locking lever 13 has been moved into its locking position, then the three locking teeth VZ will engage with three teeth gaps of the internal gearwheel Z, thus blocking the seat belt spool 3. The locking lever 13 further has an actuator arm 15, with which a transmission arm of the triggering unit depicted in FIG. 3 will engage.

The triggering unit is formed by a gearwheel 16, an inertia weight 17 and a cod spring 18, as a sensitivity spring of the triggering mechanism, as well as a catch 12. The transmission arm that is engaged with the locking arm 15 of the locking lever 13 is provided at the bottom side of the gearwheel 16 illustrated in FIG. 3. The gearwheel 16 is situated on the catch 12, which in turn is situated on the insert 10 and rotates together with the seat belt spool 3 via the seat belt shaft 9. The gearwheel 16 is rotatably mounted in the catch 12, wherein the range of rotation is restricted to a determined angular range, which corresponds exactly to the adjustment path of the locking lever 13 between the locking position and the release position thereof. The coil spring 18 is clamped between the catch 12 and the gearwheel 16, rotating the gearwheel 16 and—via the transmission arm of the gearwheel 16—also the locking lever 13 in a rest position into the release position of the locking lever 13. The inertia weight 17 is firmly clamped in the gearwheel 16.

If the rotational velocity of the seat belt spool 3, for example in the case of a vehicle collision, is rapidly increased because a passenger is pushed into the seat belt 2, then the catch 12 quickly accelerates with the seat belt spool 3. Due to the weight of the inertia weight 17 an inertia force acts against this acceleration, whereupon the gearwheel 16 then falls behind in regard to the catch 12 in opposition to the. spring force of the coil spring 18 and adjusts the locking lever 13. The dimensions of the inertia weight 17 and the coil spring 18 determine that acceleration of the seat belt spool 3, at which the locking lever 13 is adjusted into the locking position thereof by the triggering unit, thus preventing the further rotation of the seat belt spool 3.

The locking unit 4 of the seat belt retractor 1 further has an end-position locking catch, which is formed by a cover ring 19 and a recess A in a part of the perimeter of the seat belt shaft 9. The cover ring 19 has a catch lug N, which sits closely at the first end stop A1 of the recess A of the seat belt shaft 9 when the seat belt 2 is unrolled from the seat belt roll 3 and at the second end stop A2 of the recess A of the seat belt shaft 9 when the seat belt 2 is retracted onto the seat belt roll 3. The cover ring 19 further has a diameter D and a height H, wherein the cover ring 19 only has the height H1 in a segment section of a circle K. An edge R of the cover ring 19 is thus discontinued across the segment section of the circle K.

The cover ring 19 now further has three spring elements F, which sit edgingly at the housing in the assembled state, which is why the cover ring 19 is slowed down through friction in regard to the rotating seat belt shaft 9 but still rotated along between the two end stops A1 and A2. The cover ring 19 is rotated in the assembled state by the rotating seat belt shaft 9 so that the discontinuation of the edge R will stop at the position of the locking lever 13 when unrolling so that the locking teeth VZ of the locking arm 14 may engage with the internal gearwheel Z and lock the seat belt roll 3. When the seat belt 2 is retracted on the seat belt roll 3, the cover ring 19 is then rotated by the seat belt shaft 9 so that the edge R will stop at least between one of the locking teeth VZ and the internal gearwheel Z and so that, as a consequence, locking will be prevented when retracting is suddenly stopped.

Figure 4:
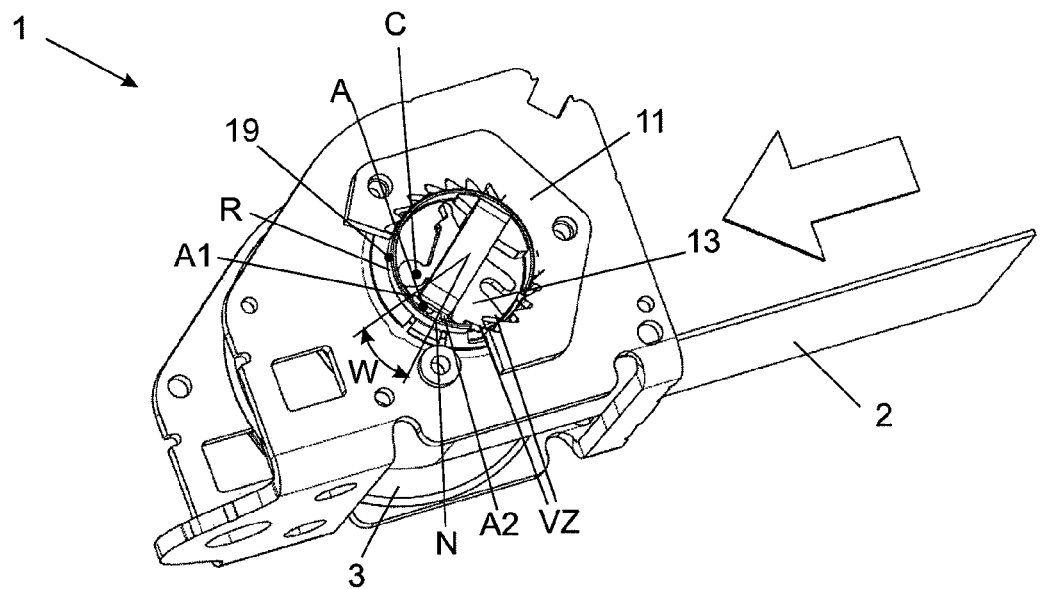
FIG. 4 shows the assembled seat belt retractor according to FIG. 1 when the seat belt is being retracted.

In FIG. 4, the seat belt retractor 1, which is completely assembled but for the housing, is illustrated with the seat belt 2 being retracted onto the seat belt roll 3. The annular gear 11 is depicted only partially in order to better visualize the cover ring 19 situated underneath. The recess A at the perimeter of the seat belt shaft 9 has an angular range W from the first end stop A1 to the second end stop A2. During retraction, the catch lug N of the cover ring 19 sits at the second end stop A2, as the cover ring 19 has been rotated clock-wise according to the recess A in the seat belt shaft 9. In this position of the cover ring 19 the circular sector K of the cover ring 19 is situated in the covering position, in which the cover ring 19 at least partially covers the region between the three locking teeth VZ and the internal gearwheel Z. Indeed, only two of the three locking teeth VZ are visible in FIG. 4, as the third locking tooth VZ is situated behind the edge R of the cover ring 19, which is why the locking lever 13 cannot lock, even in the case of very abrupt stopping of the retraction of the seat belt 2. In this way, end-position locking is thus prevented when the seat belt 2 is retracted.

Figure 5:
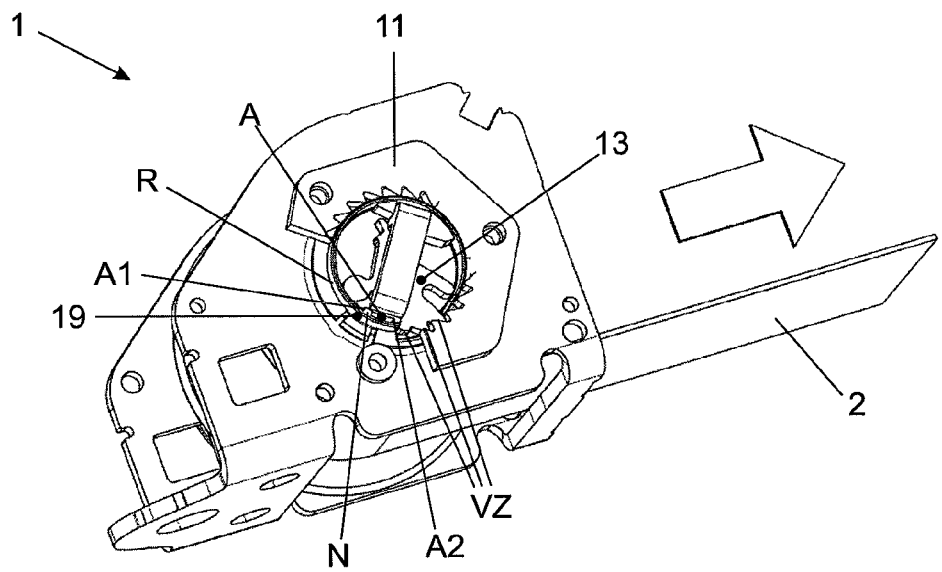
FIG. 5 shows the assembled seat belt retractor according to FIG. 1 when the seat belt is being unrolled.

In FIG. 5 the seat belt retractor 1 according to FIG. 4 is illustrated, wherein in this case a passenger has unrolled the seat belt 2 very abruptly from the seat belt spool 3, such as in the case of a vehicle collision, which is why the locking unit 4 has locked further unrolling. The locking teeth VZ are locked in place in the tooth gaps of the internal gearwheel Z. This locking position of the locking lever 13 was made possible by the cover ring 19 having been rotated with the catch lug N thereof at the first end stop A1 of the seat belt shaft 9 when the seat belt 2 was unrolled in order to adjust the cover ring 19 into the release position thereof.

The cover ring 19 thus does not prevent normal locking of the seat belt retractor 1 when the seat belt 2 is unrolled, which is why there has been created by the cover ring 19 a safe and reliable construction in order to prevent end-position locking when the seat belt 2 is retracted.

By determining the segment section of the circle K with an angular range of 10 to 40 degree and in particular of about 25 degree sufficient stability of the cover ring 19 will be guaranteed. By making provision of the locking lever 13 and the internal gearwheel Z being made of metal there is achieved the advantage that these components are especially stable and durable when locking. By making provision of two or several locking teeth there is achieved the advantage that the high forces, which are developed in a vehicle collision when the unrolling the seat belt 2 is locked, may be better drained off.

There is to be noted that the locking lever may also have other forms in order to fulfil the functionality described. The triggering unit may also be configured in a different way, as the part in the end-position locking catch that is essential for the invention is formed by the cover ring. It would also be possible for the cover ring to have no catch lug but rather a catch slot, with which a catch lug of the catch engages.

There is to be noted that the cover ring may be made of metal as well as a plastic material. It has been proven to be especially advantageous to form the cover ring from glass fibre reinforced plastic material, such as, for example, PA 6.6 having 30% glass fibres, POM having 30% glass fibres. Using such a plastic material will enable the realization of the spring elements and helps to decrease production costs.

The invention claimed is:

1. A locking unit for a seat belt retractor, which locking unit is provided at one end of a seat belt spool of the seat belt retractor, on which a seat belt is retracted, so that when the seat belt is quickly unrolled a locking arm of a locking lever is locked with an internal gearwheel fixed to prevent rotation, as a result of which the seat belt spool is locked,
wherein the locking unit comprises:
the locking lever with a centre of rotation arranged spaced apart from the centre of the seat belt spool, an actuator arm and the locking arm;
a triggering unit having an inertia weight, a counter-pressure spring and a transmission arm, which engages with the actuator arm, wherein the triggering unit is formed to rotate the locking lever about the centre of rotation and to lock the locking arm with the fixed internal gearwheel that is arranged about the locking lever in the case of a fast acceleration of the unrolling of the seat belt, conditioned by the inertia force of the inertia weight acting against the spring force of the counter-pressure spring,
wherein a cover ring having a flange, an upstanding wall extending from the flange and a central opening is provided between the locking lever and the internal gearwheel, which cover ring is rotated into a covering position when the seat belt is retracted, in which covering position the cover ring at least partially covers the region between the locking arm and the internal gearwheel in order to prevent locking, and rotated into a release position when the seat belt is unrolled, in which release position the cover ring releases the region between the locking arm and the internal gearwheel in order to permit locking, a notch formed in the upstanding wall,
wherein the locking lever is within the central opening of the cover ring, and the teeth of the locking arm extend through the notch in the upstanding wall.

2. The locking unit according to claim 1, wherein a seat belt shaft is provided in the seat belt spool secured against rotation, at the end of which facing the locking unit there is provided a recess at the perimeter, which has a first end stop and a second end stop, and that the cover ring has a catch lug, which engages with the recess of the seat belt shaft, wherein the catch lug sits closely at the first end stop when the seat belt is unrolled and at the second end stop when the seat belt is retracted.

3. The locking unit according to claim 1, wherein the cover ring has a diameter and a first height, wherein the cover ring has only a second height in a segment section of a circle in order to release the locking arm in this segment section of the circle in order to lock with the internal gearwheel.

4. The locking unit according to claim 3, wherein the segment section of the circle has an angular range of 10 to 40 degrees and in particular about 25 degrees of the perimeter of the cover ring.

5. The locking unit according to claim 1, wherein the locking lever and the internal gearwheel are made of metal.

6. The locking unit according to claim 1, wherein the locking arm has two and in particular three locking teeth, which are in each case configured to engage with a tooth gap of the internal gearwheel.

7. The locking unit according to claim 1, wherein the counter-pressure spring is formed by a coil spring.

8. The locking unit according to claim 1, wherein the cover ring has at least one spring element, which sit edgingly at a housing in order to rotate the cover ring depending on the direction of rotation of the seat belt spool by means of a catch lug between a first end stop and a second end stop.

9. The locking unit according to claim 1, wherein the cover ring is made from plastic material, in particular from glass fibre reinforced plastic material.

10. A seat belt retractor of a seat belt system for retracting and unrolling a seat belt for a passenger, wherein the seat belt retractor has a locking unit according to claim 1.

11. A locking unit for a seat belt retractor, comprising:
a spool;
an annular gear, the annular gear having a central aperture;
a first gear wheel comprising a plurality of teeth formed along a circumference of the central aperture;
a locking lever attached to one end of the spool, the locking lever having a locking arm having teeth, the locking lever movable between a first position having the teeth of the locking arm engage the first gearwheel and a second position having the teeth of the locking arm disengaged from the first gearwheel;
a trigger moving the locking lever between the first position and the second position,
a cover ring, the cover ring having a flange, an upstanding wall extending from the flange and a central opening; and
a notch formed in the upstanding wall,
wherein the locking lever is within the central opening of the cover ring, and the teeth of the locking arm extend through the notch in the upstanding wall.

12. The locking unit for a seat belt retractor according to claim 11, wherein the trigger comprises:
a catch;
a second gear wheel;
a coil spring between the catch and second gearwheel; and
an inertia weight in the second gear wheel.

* * * * *